United States Patent [19]

Harris

[11] Patent Number: 5,535,505
[45] Date of Patent: Jul. 16, 1996

[54] TUBE SLITTING TRAVELER

[75] Inventor: Richard T. Harris, Chattanooga, Tenn.

[73] Assignee: Retubeco, Inc., Ooltewah, Tenn.

[21] Appl. No.: 546,671

[22] Filed: Oct. 23, 1995

Related U.S. Application Data

[62] Division of Ser. No. 325,794, Oct. 19, 1994, abandoned.

[51] Int. Cl.$^6$ ................................... B23P 15/26
[52] U.S. Cl. .................. 29/727; 79/426.5; 79/890.02; 79/337; 79/283.5; 72/186
[58] Field of Search .................. 29/727; 890.031/426.4; 426.5/33 T, 252, 564.7, 283.5; 72/185, 186

[56] References Cited

U.S. PATENT DOCUMENTS

| | | | |
|---|---|---|---|
| 2,372,795 | 4/1945 | Rodeck | 29/727 |
| 3,474,655 | 5/1967 | Fulkenson | 72/186 |
| 3,921,482 | 11/1975 | Osburn | 83/54 |
| 4,044,444 | 8/1977 | Harris | 29/890.031 |
| 4,698,196 | 10/1987 | Fabian | 83/54 |
| 4,815,201 | 3/1989 | Harris | 29/727 |
| 5,070,608 | 12/1991 | Gray | 29/727 |
| 5,293,682 | 3/1994 | Hahn et al. | 29/727 |

*Primary Examiner*—Willmon Fridie, Jr.
*Assistant Examiner*—Marc W. Butler
*Attorney, Agent, or Firm*—Alan Ruderman

[57] ABSTRACT

A tube traveler and slitter for extracting a tube from a heat exchanger tubesheet and slitting the tube longitudinally into two segments includes two spaced apart deforming rolls having a nip between the peripheries defining a passageway. The periphery of each roll is serrated and has a cylindrical central portion of a larger diameter than the remainder of the periphery, and a cylindrical portion spaced from the central portion at each end of the roller, a truncated conical surface being between the cylindrical portions. The rollers extract and deform the tube into a configuration having a flattened central portion and a bulbous configuration at each edge. A rotary slitter blade is positioned for engaging and slitting each edge longitudinally. The axis of rotation of the slitter blades is downstream from the axes of rotation of the rolls.

14 Claims, 2 Drawing Sheets

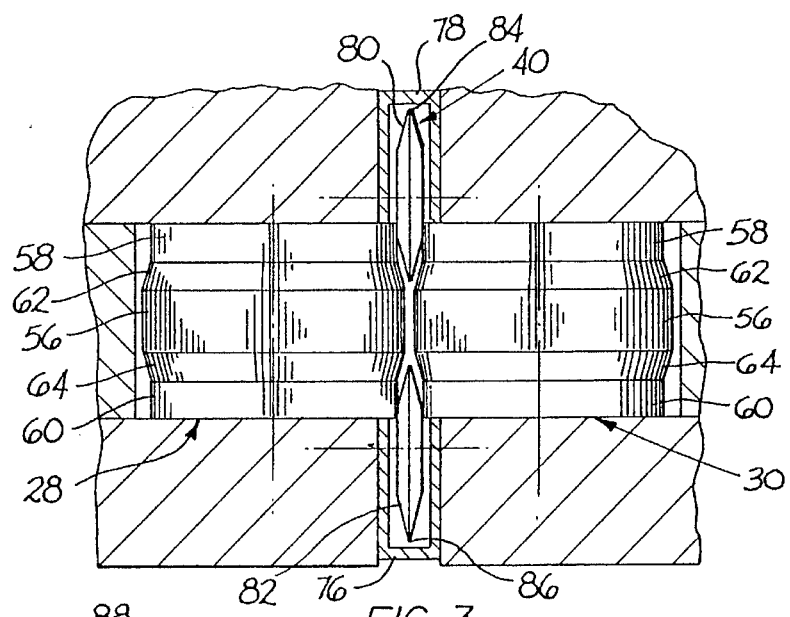
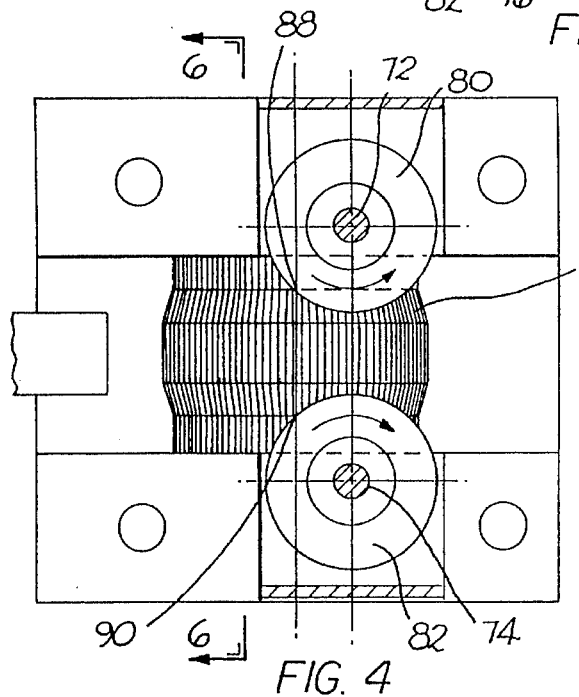
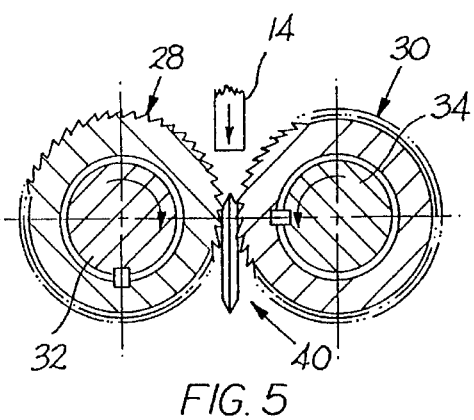
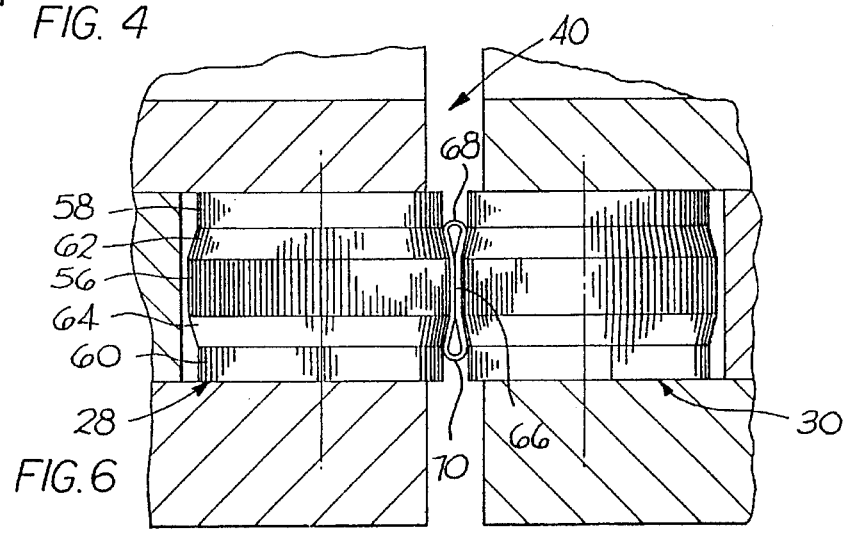

TUBE SLITTING TRAVELER

This application is a division, of application Ser. No. 08/325,794, filed Oct. 19, 1994, now abandoned.

BACKGROUND OF THE INVENTION

This invention relates to apparatus for extracting a tube from a tubesheet of a heat exchanger and slitting the tube into two parts as it is being extracted.

Condensers and other indirect heat exchangers have a large number of tubes in interference or press fit into or expanded into engagement with openings in spaced apart tubesheets to form a fluid tight seal therebetween. A fluid medium flows through the tubes while another fluid flows about or around the tubes between the tubesheets. Generally a heat transfer fluid such as water circulates through the tubes while a high temperature fluid such as combustion gases or heated water flows about the tubes and heat is transferred to the fluid within the tubes. Occasionally, it becomes necessary to remove the tubes from the tubesheet and retube the heat exchanger. Such removal and retubing may be performed when excessive scale build-up within the tubes occur, when leaks occur, as part of a preventative maintenance program, or when an excessive number of tubes become worn, penetrated or damaged in any way.

In fossil fuel power plants, when the tubes are to be extracted, the tight fit between the tubes and the tubesheets are relieved and the tubes are pulled a small distance through the tubesheet by a tube puller. Thereafter a tube traveler or extractor such as that disclosed in Harris U.S. Pat. Nos. 4,044,444 and 4,815,201 are used to completely extract each tube from the heat exchanger through the tubesheet. Such tube travelers have a pair of serrated drivers mounted on parallel shafts spaced slightly apart, the drivers being rotated in opposite directions to pull the tubes through the nip between the drivers so that the tubes are pulled and deformed from a circular to a flattened oval shape. The tubes, which may be as long as 50 to 60 feet in length, are thereafter removed to a tube chopper where they are chopped into short sections of scrap metal for recycling.

In nuclear fuel power plants, such as boiling water reactor (BWR) nuclear plants, safety regulations require that both the interior and the exterior surfaces of the tubes removed from a heat exchanger be free of contamination before they are scrapped and recycled. In the prior art either the tubes were slowly pulled from the tubesheet without deforming the tube and thereafter cut into short lengths for subsequent inspection off-site after shipping in a shielded container, or the tubes were pulled by a tube traveler and thereafter the flattened tubes were inserted into a large bulky splitter located a distance greater than a tube length from the tubesheet. The tubes had to be hand carried away from the traveler to the splitter where the flattened tubes were separated in half through the major cross-sectional dimension so that the exterior and the interior surfaces could be inspected after being chopped into scrap sections for off-site disposal or decontamination. An example of this latter process is disclosed in Hahn et al U.S. Pat. Nos. 5,276,965 and 5,293,682 where the tubes from the traveler are further flattened by a pair of serrated rollers so as to work harden the edges between the top and bottom surfaces of the flattened tube and fed to a stationary elongated wedge shaped blade which fractures and splits the deformed tube along the work hardened edges into two sections. However, as aforesaid, this apparatus provides a large bulky machine which must be located a distance of more than a tube length away from the tubesheet, i.e., 50 to 60 feet or more from the tubesheet. Thus, the entire length of potentially contaminated tube is exposed for that distance so that the area that must be protected from contamination is greatly extended. Additionally, since the tube must be carried by hand from the traveler to the splitter the process is relatively slow and makes an inefficient use of the speed of the traveler.

SUMMARY OF THE INVENTION

Consequently, it is a primary object of the present invention to provide a method and apparatus for extracting a tube from a heat exchanger tubesheet while deforming the tube as it is being extracted into a configuration which permits slitting at each deformed edge and slitting each deformed edge immediately as it is extracted and deformed.

It is another object of the present invention to provide a method and apparatus for extracting a tube from a heat exchanger tubesheet with deforming rollers which shape the tube into a substantially flattened configuration with bulbous edges, and slitting each bulbous edge from outside the deformed tube.

It is a further object of the present invention to provide a method and apparatus for extracting a tube from a heat exchanger tubesheet by a pair of serrated rotating driving rollers which drive the tube out of the tubesheet while deforming the tube into a substantially flattened configuration at a central portion and a bulbous configuration at each edge, and cutting or slitting each bulbous edge along a plane substantially parallel to the flattened portion with a rotatably mounted blade driven by the moving tube.

Consequently, the present invention provides a combination tube traveler or extractor and tube slitter comprising two spaced apart deforming rolls rotatably driven about spaced apart parallel axes and defining a passageway in the nip therebetween for axial movement of a tube drawn out of a heat exchanger tubesheet, the configuration of the deforming rolls being such as to deform the tube into a cross sectional configuration having a flattened central portion and a bulbous configuration at each edge, and a pair of rotary slitter blades mounted to engage and cut or slit a respective bulbous edge. The slitter blades are journally mounted about parallel axes spaced from the respective edge and freely rotate by the force applied by the traveling deformed tube, the axes of the slitter blades being slightly downstream of the axes of the deforming rolls and transverse to the axes of the deforming rolls such that the axis of rotation of each slitter blade lies in a plane normal to the axes of both deforming rolls. Moreover, the periphery of each slitter blade intersects the plane in which the axes of both rolls lie and effects cutting of the tube at one of those points on each blade. Additionally, in accordance with the method of the present invention a tube is withdrawn from a tubesheet and slit into two axially extending portions by pulling and deforming the tube to form it into a cross sectional configuration having a flattened axially extending central portion having a bulbous configuration at each axially extending edge, and engaging each axially extending edge with a rotary slitter blade mounted rearwardly of the deforming rollers, i.e., downstream of the axes of the deforming rollers and driving the tube so that each slitter blade engages and cuts the bulbous portion of the tube.

BRIEF DESCRIPTION OF THE DRAWINGS

The particular features and advantages of the invention as well as other objects will become apparent from the following description taken in connection with the accompanying drawings in which:

FIG. 3 is an enlarged fragmentary view of a portion of the apparatus illustrated in FIG. 2;

FIG. 4 is a cross sectional view taken along line 4—4 of FIG. 2;

FIG. 5 is a cross sectional view taken substantially along line 5—5 of FIG. 2; and FIG. 6 is a cross sectional view taken substantially along line 6—6 of FIG. 4.

DESCRIPTION OF THE PREFERRED EMBODIMENT

Figure 1:
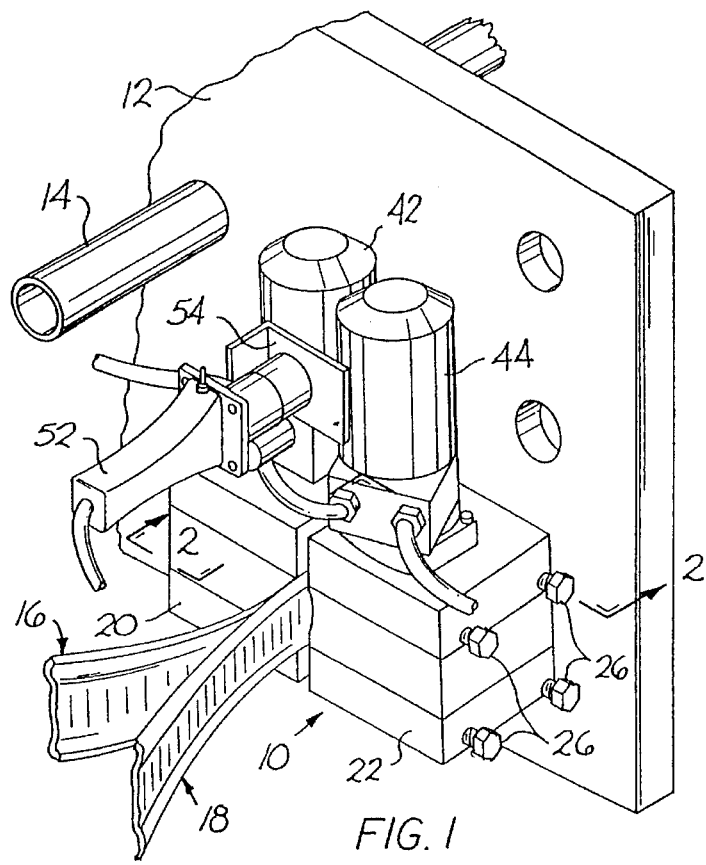
FIG. 1 is a perspective view illustrating a tube extractor and slitter constructed in accordance with the principles of the present invention and depicting a tube which has been pulled from a heat exchanger tubesheet and slit.
Figure 2:
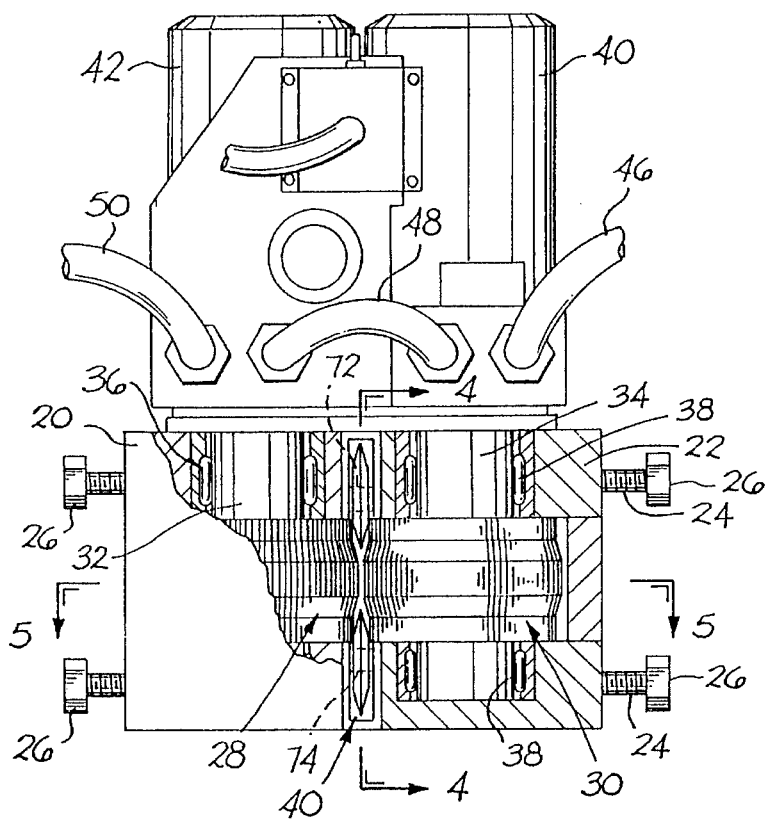
FIG. 2 is a vertical cross sectional view of the apparatus illustrated in FIG. 1 taken substantially along line 2—2 thereof.

As illustrated in FIG. 1, a tube extractor/slitter constructed in accordance with the present invention is illustrated in a disposition abutting a tubesheet 12 for extracting tubes 14 which have been partially pulled through the face of the tubesheet, the extractor/slitter acting not only to grasp and extract the tube but also to slit it into a pair of tube halves 16, 18. The extractor/slitter is structurally similar to the extractor disclosed in the aforesaid Harris U.S. Pat. Nos. 4,044,444 and 4,815,201 except for various changes for the slitting function as hereinafter described. The tube 14 is illustrated after it has been loosened from the tight fit with the tubesheet 12 and other tubesheets (not illustrated) and has been pulled by a tube puller a distance of approximately 2½ inches.

Although the apparatus may comprise a single housing, it preferably in the preferred embodiment includes a pair of housings 20, 22 positioned for movement relative to each other by a plurality of parallel rods 24 extending through both housings and having stop nuts 26 threaded on the ends thereof for limiting the separation between the housings. Mounted within each housing 20, 22 is a respective driving and deforming roll 28, 30 mounted on respective shafts 32, 34 journally supported by bearings 36, 38 mounted in the respective housing 20, 22. The periphery of each of the driving and deforming rolls 28, 30 project out of a face of the respective housing 20, 22 toward the opposite housing and define a passageway 40 therebetween through which a tube 14 may be driven or pulled, the width of the passageway being determined by the positions of the stop nuts 26. If implementation of the invention was by a single housing, the passageway would be formed therethrough and the rolls could be mounted within a cartridge or the like positioned within the passageway.

At least one of the rollers 28, 30, and preferably both, are driven by motor means. To achieve this, the upper end of the shaft 32 is coupled to a hydraulic motor 42 while the upper end of the shaft 34 may be coupled to a similar hydraulic motor 44, the motor 42 being bolted to the housing 20 and the motor 44 being bolted to the housing 22. Ideally, the motors 42, 44 are series connected, positive displacement hydraulic motors wherein the motor 44 receives hydraulic fluid under pressure through a line 46 and exhausts the fluid through a line 48 from the outlet of the motor 44 to the inlet of the motor 42. The hydraulic fluid is exhausted from the motor 42 through a line 50 and recirculated to the source of pressurized fluid. As pointed out in the aforesaid Harris U.S. Pat. No. 4,815,201 with this arrangement the flow rate and the pressure drop for each motor is substantially the same and the motors are continuously driven at the same speed and power in a synchronous manner. Although such synchronous drive of the rollers 20, 22 is desirable and provides significant advantages, other connections between the hydraulic motors may also effect a positive traveling of the tubes from the tubesheet. Although, in these latter situations some slippage may occur, slippage may not be a major disadvantage in this case since the tubes are slit. If one of the motors fails to keep up with the other motor it may be dragged along by the tube itself. Should one drive begin to slip, the other will tend to take over and if the tube becomes stuck, both may slip to prevent damage to the equipment. Additionally, although somewhat inefficient, a single motor may be utilized to drive one of the shafts 34, 36 with the other shaft driven by gearing means or the like. Whatever drive means is utilized, however, it must be understood that the shafts 34, 36 rotate in opposite directions relative to the other so as to pull a tube 14 into the passageway 40 defined by the nip between the rolls. A handle 52 secured to a bracket 54 rigidly secured to the housing of one of the motors, e.g. motor 42, permits the apparatus to be positioned relative to the tubesheet 12.

Each roll 28, 30 is a serrated roll so as to grasp and pull a tube entering the passageway 40 therebetween. As illustrated in the drawings, each roll has its greatest diameter in the central portion 56, and has axially remote cylindrical portions 58, 60 of a smaller diameter connected to the central portion 56 by respective substantially truncated conical surfaces 62, 64 tapering from the diameter of the central section 56 to the respective smaller sections 58, 60. Thus, as illustrated in FIG. 6, a tube being drawn into the passageway 40 is deformed by the rolls 28, 30 from its normal cylindrical cross section to one which has a flattened central portion 66 with a pair of bulbous shaped edges 68, 70. Thus, the tube is effectively changed in cross sectional configuration to one which has a figure-eight shape with a flattened midsection. Such configuration is substantially different from the deformation created by the prior art on tubes being withdrawn from the tubesheet. This configuration permits the deformed tube to be slit axially along the respective edges 68, 70 by a rotary blade without an anvil or supplemental backing. The material itself acts as an anvil since the flattened figure-eight configuration has been found to permit one-sided slitting.

Journalled for rotation on a respective pin 72, 74 carried in the housings 20, 22 on mounting plates or the like 76, 78 are a pair of slitter blades 80, 82. The pins 72, 74 extend intermediate the housings 20, 22 and, as best illustrated in FIGS. 4 and 6, the axes of the pins are disposed downstream of the axes of the shafts 32, 34 and thus the axes of the rollers 28, 30. Thus, the axis of each slitter blade 80, 82 lies in a plane that is normal or perpendicular to the axes of both rollers 28, 30 and closer to the exit of the passageway 40. Each slitter blade 80, 82 is a circular wheel having a sharp hardened steel wedge shaped cutting edge 84, 86 and the disposition of the slitter blade intermediate the housings 20, 22 is such that the blades are centrally located relative to the bulbous edges 68, 70 of the deformed tubes. Additionally, as illustrated in FIG. 3, the diameters of the blades 80, 82 and the disposition of the pins 72 and 74 is such that the blades 80 and 82 are disposed intermediate the smaller diameter portions 58 and 60 respectively of both rollers 28, 30 and the cutting edges 84 and 86 are disposed intermediate a portion of the conical surfaces 62 and 64 respectively of the rollers. Additionally, by positioning the axes of the slitter blades 80, 82 downstream of the axes of the rollers 28, 30, such that cutting takes place at the intersection of the peripheries of the blades and the plane of the axes of both rollers, i.e., at points 88, 90, the tubes are deformed into the flattened midsection figure-eight configuration as aforesaid as they are being contacted by the slitter blades. Thus, the bulbous edges 68, 70 of the tubes may be slit by the slitter blades engaging the leading edges of the tubes and entering from outside the deformed tubes to cleanly sever the walls of the tubes along the bulbous edge, the blades being rotated by the movement of the tubes being fed by the rollers 28, 30.

During the cutting action of the slitter blades the driving deforming rollers 28, 30 at the conical surfaces thereof support the sloped portion of the surfaces of the bulbous edges so that the slitter blades may sever the edges of the tubing rather than merely displacing the material inwardly. The configuration of the flattened mid-section figure-eight deformed tubes is such that the full beam strength of both walls of the tube offer sufficient resistance to the inward deformation that would otherwise result due to the pressure of the edge of the rotary slitting blades. The tube walls are therefore severed rather than merely displaced inwardly. No internal supporting device is thus necessary to prevent the displacement since the material of the tube itself acts as an anvil. By using a rotary blade to slit the tube, minimal force is required and thus not only is a sharp edge maintained over a long period of time, but also the cutting does not rob excessive force from the application to the rollers 28, 30 necessary for extracting and traveling the tubes out of the tubesheet. The traveling and forming action of the combination rollers 28, 30 impart internal stresses on the tube so that when the walls are slit, the two flattened half sections curl outwardly in the respective directions of the rotating rolls. This results in two substantially neat coils formed from the severed tube halves and the entire operation may take place within five feet of the tubesheet.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. Apparatus for axially removing a metal tube from a heat exchanger tubesheet and slitting the tube axially into a pair of segments, said apparatus comprising a pair of adjacent housings, each of said housings having a front face for abutting said tubesheet, a rear face and an open side face, mounting means for mounting said housings with the open side faces opening onto the other housing, a driving and deforming roll having a periphery journalled for rotation about an axis within each housing and positioned with the periphery extending beyond the open face to define a passageway between the rolls, motor means for driving said rolls in opposite directions for grasping and driving a tube axially through said passageway in a direction from said front face toward said rear face, the periphery of each roll having a central section and adjacent sections for deforming said tube into a configuration having a flattened central portion and a pair of remote bulbous shaped spaced apart edges, and rotary slitter blade means mounted intermediate said housings positioned for slitting each of said edges axially as said tube is driven through said passageway.

2. Apparatus as recited in claim 1, wherein said slitter blade means comprises a circular slitter blade corresponding to each edge mounted for rotation about an axis, and the axis of rotation of each slitter blade lies in a plane that is substantially perpendicular to the axes of rotation of both deforming rolls.

3. Apparatus as recited in claim 2, wherein the axes of rotation of said slitter blades are disposed further from said front face than the axes of rotation of said deforming rolls are disposed from said front face.

4. Apparatus as recited in claim 1, wherein said central section has a cylindrical configuration with a diameter larger than that of the cross sectional dimension of the remainder of said roll.

5. Apparatus as recited in claim 4, wherein the periphery of each roll has a pair of truncated conical surfaces adjacent said central section, and an outer section adjacent each truncated conical surface, the outer sections having a substantially cylindrical configuration.

6. Apparatus as recited in claim 5, wherein said slitter blade means comprises a circular slitter blade corresponding to each edge mounted for rotation about an axis, and the axis of rotation of each slitter blade lies in a plane that is substantially perpendicular to the axes of rotation of both deforming rolls.

7. Apparatus as recited in claim 6, wherein the axes of rotation of said slitter blades are disposed further from said front face than the axes of rotation of said deforming rolls are disposed from said front face.

8. Apparatus for axially removing a metal tube from a heat exchanger tubesheet and slitting the tube axially into a pair of segments, said apparatus comprising means for defining a housing having a front face for abutting said tubesheet and a rear face spaced from said front face, a passageway formed in said housing extending from said front face to said rear face, first and second driving and deforming rolls rotatably disposed in said housing for rotation about a respective parallel axis, said rolls having respective peripheries disposed in said passageway and spaced apart to define a nip therebetween, motor means for driving said rolls in opposite directions for grasping and driving a tube axially through said passageway between said nip in a direction for said front face towards said rear face, the periphery of each roll having a central section and adjacent sections for deforming said tube into a configuration having a flattened central portion and a pair of remote bulbous shaped spaced apart edges, and rotary slitter blade means disposed in said housing positioned for slitting each of said edges axially as said tube is driven through said nip.

9. Apparatus as recited in claim 8, wherein said slitter blade means comprises a circular slitter blade corresponding to each edge mounted for rotation about an axis, and the axis of rotation of each slitter blade lies in a plane that is substantially perpendicular to the axes of rotation of both deforming rolls.

10. Apparatus as recited in claim 9, wherein the axes of rotation of said slitter blades are disposed further from said front face than the axes of rotation of said deforming rolls are disposed from said front face.

11. Apparatus as recited in claim 8, wherein said central section has a cylindrical configuration with a diameter larger than that of the cross sectional dimension of the remainder of said roll.

12. Apparatus as recited in claim 11, wherein the periphery of each roll has a pair of truncated conical surfaces adjacent said central section, and an outer section adjacent each truncated conical surface, the outer sections having a substantially cylindrical configuration.

13. Apparatus as recited in claim 12, wherein said slitter blade means comprises a circular slitter blade corresponding to each edge mounted for rotation about an axis, and the axis of rotation of each slitter blade lies in a plane that is substantially perpendicular to the axes of rotation of both deforming rolls.

14. Apparatus as recited in claim 13, wherein the axes of rotation of said slitter blades are disposed further from said front face than the axes of rotation of said deforming rolls are disposed from said front face.

* * * * *